United States Patent
Levow et al.

(10) Patent No.: US 8,775,604 B2
(45) Date of Patent: Jul. 8, 2014

(54) DISTRIBUTED FREQUENCY DATA COLLECTION VIA INDICATOR EMBEDDED WITH DNS REQUEST

(75) Inventors: Zachary Levow, Mountain View, CA (US); Joseph Wilson Evans, Santa Clara, CA (US)

(73) Assignee: Barracuda Networks, Inc., Campbell, CA (US)

( * ) Notice: Subject to any disclaimer, the term of this patent is extended or adjusted under 35 U.S.C. 154(b) by 258 days.

(21) Appl. No.: 12/610,511

(22) Filed: Nov. 2, 2009

(65) Prior Publication Data

US 2010/0049848 A1    Feb. 25, 2010

Related U.S. Application Data

(62) Division of application No. 11/903,605, filed on Sep. 24, 2007.

(51) Int. Cl.
| | |
|---|---|
| *G06F 15/173* | (2006.01) |
| *G06F 15/16* | (2006.01) |
| *G06F 21/00* | (2013.01) |
| *G06F 12/14* | (2006.01) |

(52) U.S. Cl.
USPC ........... 709/224; 709/206; 709/229; 713/180; 713/181; 726/3

(58) Field of Classification Search
USPC ........ 709/224, 206, 229; 713/180, 181; 726/3
See application file for complete search history.

(56) References Cited

U.S. PATENT DOCUMENTS

| 8,103,875 | B1 * | 1/2012 | Ramzan et al. ............... 713/170 |
| 2004/0073617 | A1 * | 4/2004 | Milliken et al. .............. 709/206 |
| 2005/0286564 | A1 * | 12/2005 | Hatley et al. .................. 370/503 |
| 2006/0095966 | A1 * | 5/2006 | Park ............................... 726/22 |
| 2006/0218644 | A1 * | 9/2006 | Niles et al. ....................... 726/26 |
| 2007/0220607 | A1 * | 9/2007 | Sprosts et al. .................. 726/24 |
| 2008/0046970 | A1 * | 2/2008 | Oliver et al. ...................... 726/3 |
| 2008/0104180 | A1 * | 5/2008 | Gabe ............................. 709/206 |
| 2009/0043900 | A1 * | 2/2009 | Barber ........................... 709/228 |

* cited by examiner

*Primary Examiner* — Viet Vu
*Assistant Examiner* — Herman Belcher
(74) *Attorney, Agent, or Firm* — Duane Morris LLP

(57) ABSTRACT

Domain Name Service (DNS) requests are used as the reporting vehicle for ensuring that security-related information can be transferred from a network. As one possibility, a central facility for a security provider may maintain a data collection capability that is based upon receiving the DNS requests containing the information being reported. In an email application, if a data block is embedded within or attached to an email message, an algorithm is applied to the data block to generate an indicator that is specifically related to the contents of the data block. As one possibility, the algorithm may generate a hash that provides a "digital fingerprint" having a reasonable likelihood that the hash is unique to the data block. By embedding the hash within a DNS request, the request becomes a report that the data block has been accessed.

7 Claims, 4 Drawing Sheets

DISTRIBUTED FREQUENCY DATA COLLECTION VIA INDICATOR EMBEDDED WITH DNS REQUEST

TECHNICAL FIELD

The present invention relates generally to computer network security and more particularly to enabling detection of widespread "events" which are indicative of network security concerns, such as a distribution of spam or malware (for example, a virus, worm or spyware).

BACKGROUND ART

Along with the many benefits of data and communication exchanges as a result of the Internet, there are significant risks. Providing security for a computer network so as to prevent disruption of network operations is an increasing concern for network administrators. A security measure that has become a standard practice is to use a firewall as a chokepoint for the network. The firewall enforces one or more sets of rules which determine access to and from nodes of the network.

Firewalls utilize various techniques to provide security for a network. One such technique is packet filtering. The firewall may examine packets to determine origins, destinations and content. All packets that violate a rule are discarded. As another technique, security measures may be applied at lower levels. Thus, there may be rules that are specific to determining whether to enable establishment of a Transmission Control Protocol (TCP) connection or a Universal Datagram Protocol (UDP) connection. In addition to providing rules that are specific to packet filtering or specific to types of connections, there are approaches that are specific to a particular application. As examples, there may be rules directed to a File Transfer Protocol (FTP) application, a Telnet application, HyperText Transfer Protocol (HTTP), or Simple Mail Transfer Protocol (SMTP).

Network security for a particular network may be provided by using a number of separate components. It is typical for the application-level firewall directed to electronic mail (email) to be a separate component. Thus, there may be a general firewall at the chokepoint of the network and an internal "spam filter" that applies security measures to email messages of the network. For network email messages having destinations or origins outside of the network, there may be different sets of rules applied at the spam filter and at the general firewall.

As used herein, the term "spam" is defined as unsolicited messages intended for bulk distribution. With respect to email, spam is a form of abuse of the SMTP. A spam email may be a mere inconvenience or annoyance, as is the case if the email includes advertisement. However, a spam email may also include a virus or a "worm" which is intended to affect operation or performance of a device or the entire network. At times, spam is designed to induce a person to disclose confidential personal or business-related information. Additionally, even unharmful spam is a financial drain to large corporations.

A commercial supplier of spam filters will often provide regular updates for the application of security rules. The supplier may operate a central location that identifies the need for updated rules and that has Internet access to spam filters located at different networks. A spam filter of a particular network may collect information regarding activity within the network. This activity may be useful to the centralized supplier for the purpose of identifying "events" which indicate the need for rule or definition updates. A concern is that if the reporting information must pass through one or more "chokepoint" firewalls to exit the network for transmission to the central facility, the transmission may be blocked. Because the different security devices are separately controlled, the "innocent" transmission may be interpreted as being a distribution of confidential data, for example. If the centralized facility is to have the ability to quickly identify and respond to an intrusive event, such as a widespread distribution of a virus or worm, reporting information must be allowed to pass from the network. This concern also applies to other network security devices that benefit from the ability of transmitting reporting data.

SUMMARY OF THE INVENTION

The concern that the reporting of information useful to providing network security will be blocked is addressed by utilizing Domain Name Service (DNS) requests as the reporting vehicle. The potential blocking of useful report information occurs because a wide range of different security rules are applied by different independent networks and even by different security devices within a single network. However, nearly all networks allow DNS requests to be forwarded from a system that is not identified as being "suspect." Thus, reporting information by use of DNS requests allows the information to reach its intended target. For example, a central facility of a security provider may maintain a data collection capability that is based upon receiving requests containing "phantom" domain names which specify the information being reported.

The method of monitoring data traffic at a particular network includes detecting each occurrence of a transfer of a "block of data," which may be a file or other data assembly, such as the relevant IP addresses of a transmission within the data traffic being monitored. In an email application, the block of data may be one that is embedded within or attached to an email message. As two examples, the block of data may be an image file or a data file. However, the block of data in the email application may merely be the IP address of the sender system, receiver system, or other system (or the corresponding URL) that is referenced within the body of an email message. This reporting of IP addresses may be the focus in other security applications as well.

For each transfer of a block of data, an indicator is generated. The indicator is specifically related to contents of the block of data. In the preferred embodiment, the indicator is generated by applying a particular algorithm to the block of data to provide a "digital fingerprint" as a function of the algorithm. The digital fingerprint may not be unique to the contents, but has a reasonable likelihood of being unique to the particular block of data. A standard cryptographic hash function may be used as the algorithm. MD5 (Message-Digest Algorithm 5) is a known algorithm that is used to verify data integrity, but may be used in the present invention to define the digital fingerprint. An MD5 hash is typically a 32-character hexadecimal number. Following the generation of an MD5 hash for a transferred block of data, the number may be used in forming a "phantom" domain name that is embedded in a DNS request. The original transfer of the block of data is then reported by a transmission of the DNS request. While an algorithm which generates an MD5 hash is one possible approach, alternative algorithms which provide indicators which are reasonably likely to be unique to particular blocks of data may be substituted.

As noted, an application of the invention is one in which the DNS requests are directed to a central facility of a security provider which maintains data collection. The DNS requests may be transmitted to the central facility via the Internet, thereby enabling the remote site to determine a count of occurrences of transfers of each block of data. As an example, when an email filter of a particular network detects the transfer of an email attachment, the algorithm is applied to the attachment and the resulting hash is used as the first portion of a DNS query, such as 2978546CDFADBE.barracuda.com. The second portion of the DNS request ensures that the request is properly directed to the central facility. If the same algorithm is applied at different reporting networks, spikes of "events" that are indicative of security breaches may be identified at an early stage. Such spikes in the frequency of transfers occur with widespread dissemination of a virus, a worm or spam, for example. The security provider may then provide updates of filtering rules so as to combat the potential security breach.

As an alternative to transmission of a DNS request for each occurrence of a transfer of a block of data, the individual networks may independently accumulate counts of different blocks of data and report the counts to a central facility when a threshold number or a threshold time is reached. For example, if the reporting of certain data is not considered time-critical, the data may be accumulated for a selectable period of time (such as one hour) so that the transmission of a "reporting DNS request" at the end of the time period will include the relevant count. Thus, a single transmission will indicate the number of times that a particular digital fingerprint (such as an MD5 hash) has been generated during the time period. In this embodiment, a reporting DNS request is specific to a single MD5 hash. Alternatively, a single reporting DNS request may include an aggregate of MD5 hashes or other indicators that are related to particular blocks of data. For this application, the receiving site for the reporting DNS requests must be configured to dissect a DNS request in order to identify each MD5 hash within an aggregated DNS request. By way of example, each MD5 hash may be separated by a symbol, such as a "punctuation dot."

As is known in the art, transmission of a DNS request is accompanied by the expectation of a response. In one embodiment of the invention, the responses to reporting DNS requests may be used to provide security enforcement. If a central facility receives reporting DNS requests from a number of different networks, responses to the different networks may be used to initiate blocking actions by the networks. The data collection capability at the central facility may detect evidence of distribution of spam or malware (e.g., virus, worm or spyware), with the responses then being used to initiate a blocking action. Other possible actions are to quarantine certain transmissions or to defer a decision as to how to proceed.

A potential problem is that while a first DNS request (e.g., 2978546CDFADBE.barracuda.com) having a particular hash will be transmitted from a network and will reach the intended central facility, it is common for DNS information to be locally cached in order to increase efficiency in satisfying subsequent DNS requests. If DNS information relevant to a particular DNS request is locally cached, the information may be used to service subsequent DNS requests, effectively blocking the requests from reaching the central facility. To overcome this problem, each report of information that uses a DNS request as its transmission vehicle may be made unique. One possible solution is to provide a date-and-time stamp for each DNS request intended for the central facility. The format of the stamp is not critical, but must be known at the central facility, so that the stamp may be stripped at the central facility. The stamp may precede or follow the hash. As a second solution, each hash-containing DNS request may include a value segment that is incremented for each transmission of a particular DNS request, such as the prefix N- (where N is the current count 1, 2, 3 . . . ). Thus, the fifth transmission of a particular hash may be a DNS request of 5-2978546DJSKDJM.barracuda.com.

Preferably, there is a means for verifying the source of a reporting DNS request. The concern is that data collection at a central facility may be rendered unreliable if it is possible for unauthorized sites to send reporting DNS requests. As one possibility, a digital signature may be required for each reporting DNS request. The use of public key encryption is well known in the art.

As viewed from the central security provider for a number of different networks, the invention includes receiving the DNS requests from the various networks, determining the frequencies of transfers of different data blocks based on the reception of DNS requests that include hashes indicative of the different data blocks, and determining adaptive security measures at least partially on the basis of determinations of the frequencies of transfers. The adaptive security measures may be implemented as a step of forwarding security rules or definitions to the different networks in order to block subsequent occurrences of transfers of specific blocks of data into or out of the networks. In an email security application, the rules and definitions may be forwarded to spam filters of the various networks. However, the invention may be applied to other security applications and may be applied within a single network (e.g., a wide area network (WAN) that does not require connection to the Internet.

A network that is adapted to use the invention may include all of the conventional components of a network, but will include an "algorithm component" specific to generating the digital fingerprints. This algorithm component may be implemented in software, dedicated hardware, or a combination of software and hardware. Again referring to the email security application, a network email security device, such as a spam filter, may include the algorithm component and a reporting component that forms and transmits DNS requests that include the digital fingerprints. Because the reporting information is contained within a DNS request, the information will exit even a network having highly protective rules applied at a chokepoint firewall.

While the invention has been described primarily with reference to collecting data for purposes of network security, the use of DNS requests as reporting vehicles for data collection may be used in other applications. At each of a number of different nodes, information that is determined to be relevant to the data collection is embedded within a DNS request in a format consistent with the protocol for transmissions. Unlike other DNS requests transmitted from the nodes, the information-reporting DNS requests are forwarded for purposes of enabling the data collection. An advantage of the use of DNS requests as the reporting vehicles is that the transfer of information is less likely to be blocked by rules applied at network security devices, such as chokepoint firewalls. As previously described, there may be a need to incorporate a unique feature into the DNS requests from a particular node, so that the DNS requests are not satisfied by operation of a local DNS server. Merely as two possibilities, the unique feature may be a time (date) stamp or may be an incremented count for duplicate DNS requests from the particular node.

DETAILED DESCRIPTION

Figure 1:
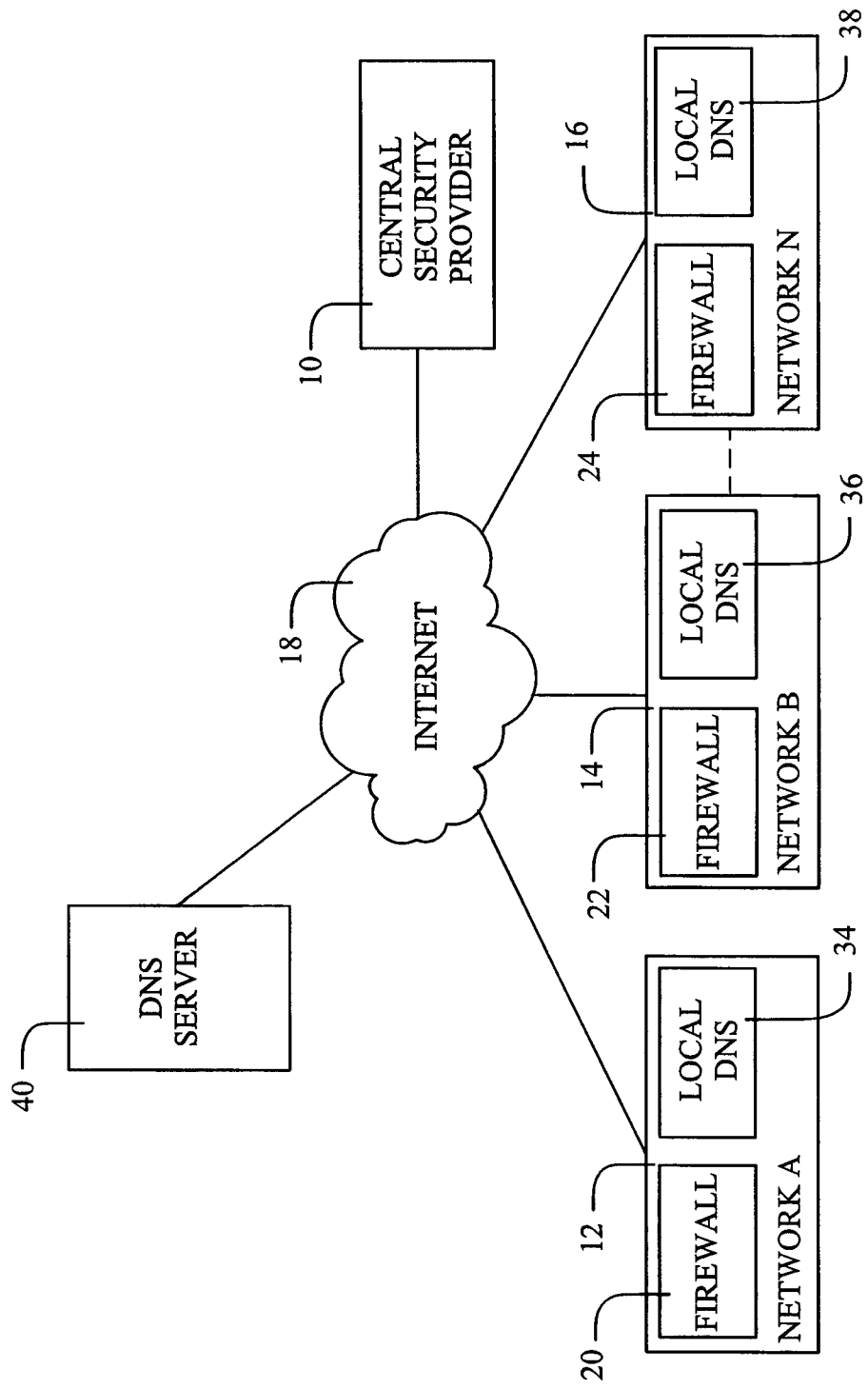
FIG. 1 is a schematic representation of a multi-network environment in which the present invention may be employed.

With reference to FIG. 1, a single security provider 10 may be enabled to provide Internet security for a number of different autonomous networks 12, 14 and 16. While the networks are related with respect to connection to the same security provider, the networks are "autonomous" with respect to network management. For example, each network may be specific to a business or an educational facility. The term "network" is used herein in its conventional definition as an organization of data processing nodes that are interconnected for the purpose of data communication. Typical nodes include computers.

The central security provider 10 is connected to the different networks 12, 14 and 16 via the global communications network referred to as the Internet 18, so as to allow updates in response to detecting new security breaches. The invention will be described with reference to its application via the Internet, but may be used within connectivity environments (e.g., WANs) that include exchanges of DNS requests which do not require the Internet. Each network includes a firewall 20, 22 and 24 which functions as a chokepoint on the network. The firewall utilizes a set of rules to determine if access to or from the network should be allowed or denied.

Figure 2:
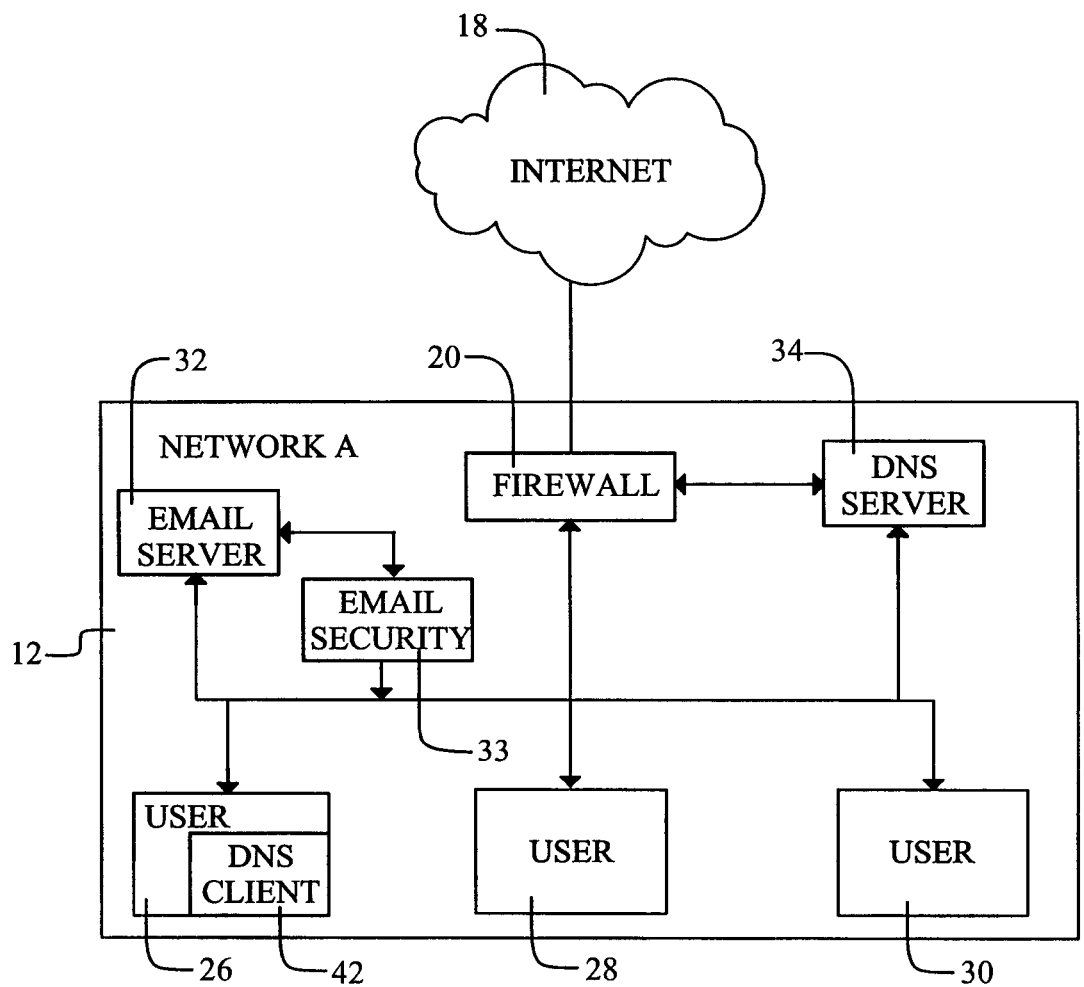
FIG. 2 is a schematic representation of components of one of the networks of FIG. 1.

A typical network 12 is shown in FIG. 2 as including a number of user devices 26, 28 and 30. Each "user" is a computer or other Internet-enabled device of the network. The network is also shown as including an email server 32. The email server supports the various users with respect to sending and receiving email messages. An email security device 33 is enabled to enforce security rules to these transmissions. The components of the email security device will be described below. As is known in the art, the network 12 will typically include a number of other components, such as routers and gateways. However, only components which are significant to a proper understanding of the invention are shown in FIGS. 1 and 2.

When a person at one of the user devices 26, 28 and 30 sends or receives an email message or accesses a website, the Domain Name Service (DNS) is implemented. The location of a website or node on the Internet is identified by its IP address. The person attempting to reach the website may initiate contact by sending a request using the IP address of the website. The IP address is a long and awkward numerical address that is difficult to remember (twelve digits segmented by three decimals). However, a domain name may be used in place of the IP address. A Universal Resource Locator (URL) is based on a domain name with the protocol specified (e.g., http://www.mywebsite.com). The URL is translated into the appropriate IP address by the DNS. Therefore, a user request for access to a website is normally a combination of two requests. The first request is the request to perform the translation of the domain name portion of the URL to the appropriate IP address. The second DNS request is sent to the actual IP address of the requested URL.

In FIGS. 1 and 2, the DNS system is represented by local DNS servers 34, 36 and 38 on the networks 12, 14 and 16, as well as by the external DNS server 40 available via the Internet 18. The DNS system is a hierarchical database. The local servers 34, 36 and 38 may be considered to be the lowest level in the hierarchy, while the external DNS server represents a simplification of the remainder of the complex hierarchy. The user device 26 is shown as including a DNS client 42, which is a program that runs on a computer or other Internet-enabled device and generates a DNS request on behalf of another program, such as a web browser or email program. For website access, the DNS request includes the indication of the domain name input by the person. Not all networks include a local DNS server 34, 36 and 38, but if one exists the DNS request is initially routed to this local server. On occasions in which the local DNS server does not have stored access of the IP address for the requested domain name, the server sends a query to an external DNS server within the DNS hierarchy 40. On the other hand, if the local server includes the required information regarding the relationship between the requested domain name and the appropriate IP address, the original request may be satisfied without access to the external DNS server. As one possibility, the local server may be aware of the mapping between the domain name and the numerical IP address if a DNS record of the mapping is stored in cache as a result of a recent request for the same information.

As previously described, a concern with a networking environment such as that shown in FIGS. 1 and 2 is that the reporting of useful information to the central security provider 10 may be blocked by the firewalls 20, 22 and 24 of the different networks 12, 14 and 16. An Internet-wide "event" can be more quickly and easily detected if information is acquired from a number of different networks. For example, if a virus or a worm is distributed as an attachment to email messages, a sudden "spike" in the transferring of the file will be more readily apparent if the monitored population is large. In accordance with the invention, the information is transmitted by utilizing DNS requests as the reporting vehicle. Such requests are not blocked by conventional chokepoint firewalls.

Figure 3:
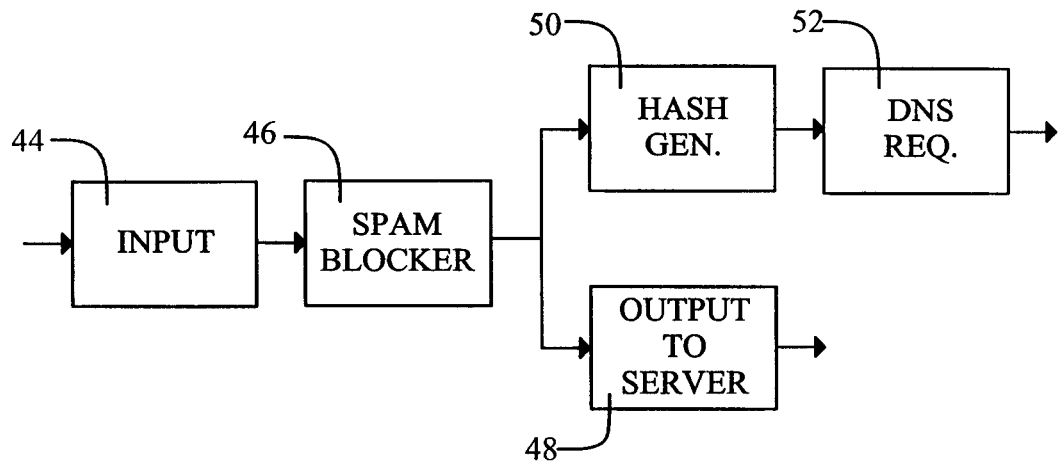
FIG. 3 is a block diagram of components of the email security device of FIG. 2, in accordance with one embodiment of the invention.

FIG. 3 is one possible implementation of the email security device 33 of FIG. 2. However, other implementations are possible. Additionally, the invention may be utilized in applications other than providing email security. The device includes an input 44. Connectivity of the security device is conventional. That is, the device is connected in order to enforce security measures for both incoming and outgoing email messages. The security measures are defined by the central security provider 10 of FIG. 1 or by a combination of the central security provider and the particular network administrator. Often, the device is referred to as a spam filter.

A spam blocker 46 is a conventional component. In the preferred embodiment, the spam blocker is responsive to the central security provider 10 for updating rules and definitions. Spam blocking techniques include word filtering, rule-based scoring, the use of allowable IP addresses (white lists), the use of restricted IP addresses (black lists), and Bayesian filtering. With regard to the invention, the spam blocker additionally (or alternatively) applies techniques for combating malware.

Data blocks which are not in violation with one of the rules may be parallel processed. The email security device represented in FIG. 3 includes an output 48. The output can be connected in the conventional manner to the email server 32 shown in FIG. 2. While the output may be connected in a conventional manner, unconventional approaches may be utilized without diverging from the invention.

While the input 44, the spam blocker 46 and the output 48 may be conventional components, the hash generator 50 is an algorithm component that is unconventional to security devices such as email spam filters. Nevertheless, features of this component are closely related to teachings within U.S. Pat. No. 6,330,590 to Cotten. The hash generator is used to provide an indicator that is at least partially based on contents of a data block received at the input 44. The data block may be an attachment to an email message or an embedded image, but other applications are contemplated. As one possibility, the hash generator 50 may apply an MD5. As is known in the art, an MD5 is an algorithm that may be used to verify data integrity. However, as used in the present invention, the algorithm is used for data identification. Other algorithms which provide a "digital fingerprint" may also be used. The digital fingerprint is not necessarily unique in the manner that a human fingerprint is unique to a particular person, but the digital fingerprint has a very high likelihood of uniquely identifying the data block.

A DNS request component 52 is at the output of the hash generator 50. The DNS request component forms a DNS request having a conventional format. However, the DNS request includes the indicator of the data block. By way of example, if the hash generator executes a checksum (other than MD5) which provides an indicator of 2978546CDFADBE, a DNS query may be 2978546CDFAD-BE.barracuda.com. The second portion of this DNS query ensures that the request is properly directed. The DNS request is then forwarded from the network in the usual manner.

In some applications, a third portion of DNS requests in accordance with the invention may be beneficial or even required. In FIG. 2, the local DNS server 34 operates to increase the efficiency of satisfying DNS requests by storing DNS information in a local cache. Thus, after a first DNS request is properly processed, the server 34 will cache the information necessary to satisfy a subsequent DNS request. While the server operates well for its intended purpose, there is a potential that a hash-containing DNS request will not reach its intended target after a first transmission of the particular request, since the first request will result in local caching. To overcome the difficulties presented by the use of DNS servers, a unique feature may be incorporated into each DNS request that is formatted in accordance with the invention. As one possible solution, each DNS request may include a date-and-time stamp that precedes or follows the hash or other indicator of the information being reported. The stamp can then be stripped when the DNS request reaches the intended target. As another possible solution, the hash-containing DNS request may include a value portion that is incremented for each transmission of a particular DNS request. The value portion may merely be "N-," where N is the current count. Within this example, the third transmission of the above example would be a DNS request for 3-2978546DJSKD-KJM.barracuda.com.

The method steps will be described briefly with reference to FIGS. 3 and 4. At step 54, a data block is received at the input 44 of the security device. As previously noted, the data block may be a file or may merely be IP addresses relevant to a particular transmission. If the rules implemented at the spam blocker 46 do not prevent passage of the data block, the selected algorithm will be executed by the hash generator 50 at step 56. The hash or other digital fingerprint is then used to formulate a DNS request at step 58, so that the hash-indicative DNS request may be transmitted at step 60. The transmission preferably includes an encrypted "signature" that may be used to verify authorization to formulate and transmit the DNS requests that are used to report information. As previously described, the DNS request includes the code that is the digital fingerprint. As an alternative, a code may be formed which identifies the digital fingerprint. Thus, the DNS request may include a code indicative of the hash. This would require another level of communication between the network and the central security provider, since both would require knowledge of the relationship between the hash and the code.

The invention may also include the step 61 of receiving an "enforcement response" to the DNS request that was transmitted at step 60. Rather than the standard response to the DNS request, the enforcement response may include instructions. Thus, a central security provider may provide immediate instructions to the network, rather than being limited to providing updates to a set of rules applied at the network. Possible enforcement responses include instructions to block transmissions to or from a particular IP address, instructions to block transmission of a particular file, instructions to defer a determination, or instructions to enable transmissions.

Figure 4:
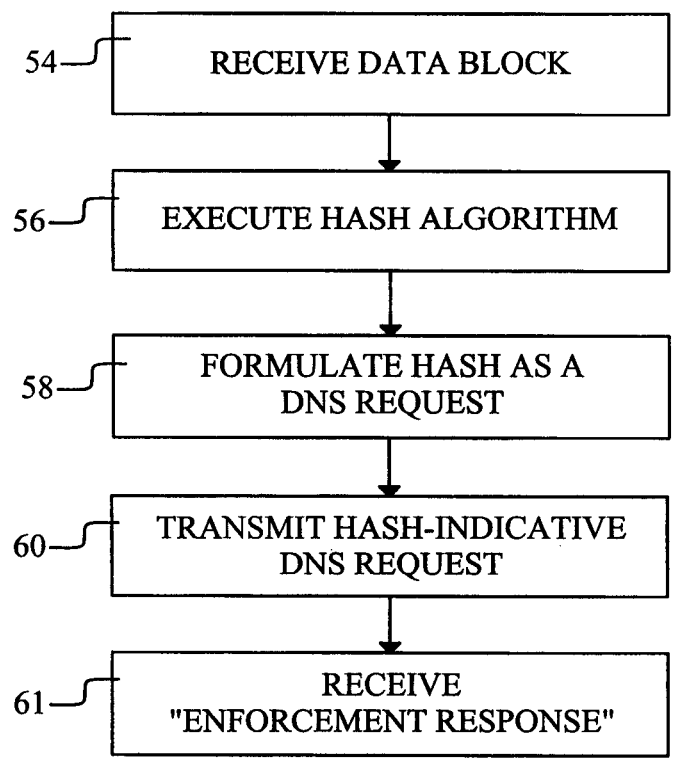
FIG. 4 is a process flow of steps for execution within the email security device of FIG. 3.

The method of FIG. 4 may be implemented at a single network that benefits from the ability to transmit reporting information regarding data blocks. A greater benefit is achieved if the method is utilized at a number of different networks. In the embodiment of FIG. 1, each network 12, 14 and 16 may report to the central security provider 10. Because the reporting information is formatted as a DNS request, the firewalls 20, 22 and 24 will not block the transmission of the reporting information from the network.

Figure 5:
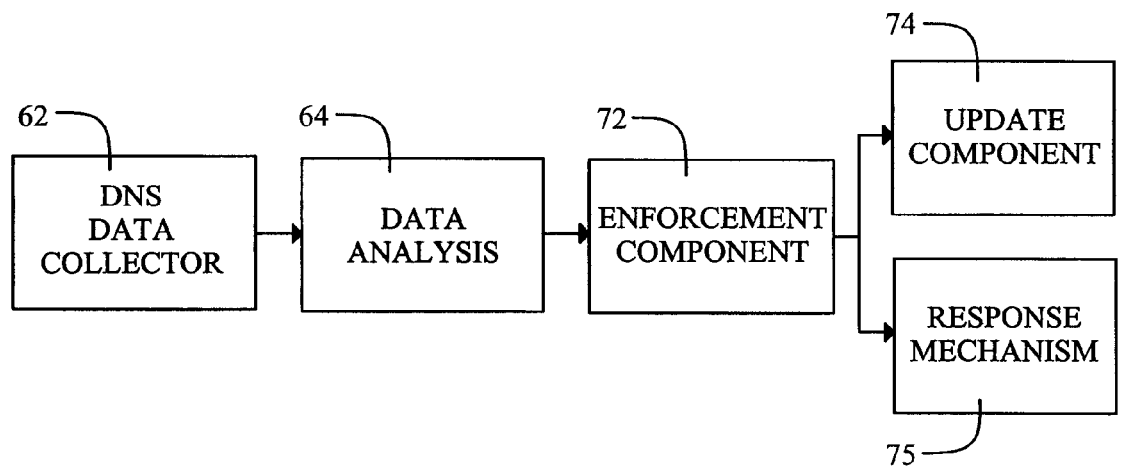
FIG. 5 is a block diagram of components for use within the central security provider of FIG. 1 in accordance with one embodiment of the invention.

In FIG. 5, selected components of the central security provider 10 are shown. A DNS data collector 62 receives the reporting information that is embedded within the DNS requests. In cooperation with the data analysis component 44, the data collector may count the occurrences of receiving each MD5 hash or other indicator that is indicative of a particular block of data. Thus, in the method steps of FIG. 6, the DNS requests are detected at step 66 and hashes are identified at step 68 for any DNS request that includes reporting information. Of course, a central security provider will receive DNS requests unrelated to reporting information. These conventional DNS requests are processed in the conventional manner. In step 70, the frequency of accessing a particular data block is determined. For example, the number of times a particular email attachment is sent to the users at the different networks may be counted in order to determine whether a "spike" of activity is occurring. Such spikes may be interpreted as distributions of viruses or other malware, if no other explanation for the spike is identified.

Figure 6:
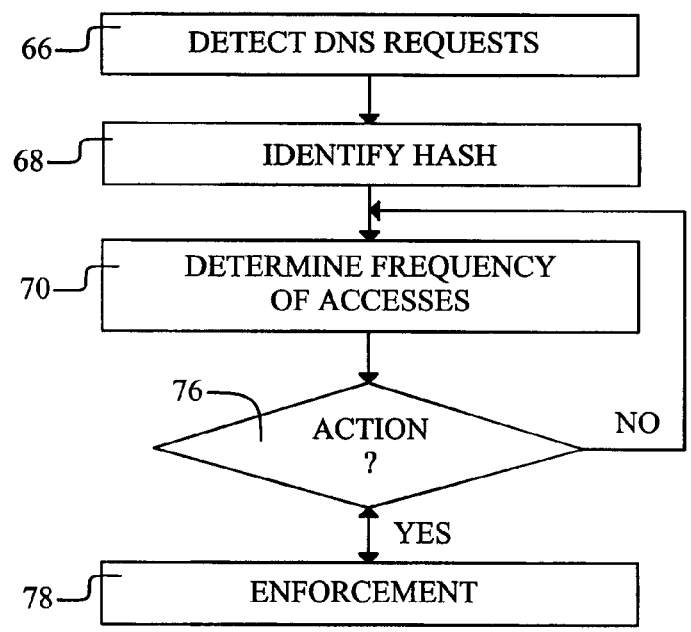
FIG. 6 is a process flow of steps for implementation by the components of FIG. 5.

In addition to the DNS data collector 62 and the data analysis component 64, FIG. 5 includes an enforcement component 72, an update component 74, and a response mechanism 75. The enforcement and update components and the response mechanism may be cooperative to determine the appropriate action in response to detecting a potential breach of security, such as a distribution of malware. As indicated in FIG. 6, a decision step 76 determines whether responsive action should be taken. A threshold number of accesses determined at step 70 may trigger an affirmative determination at step 76. If circumstances that dictate responsive action are identified, enforcement occurs at step 78. As one possibility, the update component 74 may be in communication with the security devices at the different networks 12, 14 and 16 to allow changes in the security rules enforced at the networks. As another possibility, an "enforcement response" that was described when referring to step 61 of FIG. 4 may be generated for transmission via the response mechanism 75.

The invention has been described as being one in which a DNS request is formulated and transmitted each time that the algorithm is applied to a data block. As one alternative, each network may be configured to accumulate a preliminary count which is systematically transferred to the central security provider 10. In order to ensure that the systematic transfer of the subtotal is not blocked by the firewall of the network, the information is reported via a DNS request. The difference is that the DNS request is representative of both the block of data and the subtotal. The systematic transfer may be based on time (e.g., a transfer each hour) or on reaching a threshold number.

Rather than including a single hash (or other type of digital fingerprint representative of a specific data block), the DNS requests that are used to report data may include a string of hashes representative of different data blocks. Thus, if a number of data blocks are received, the algorithm may be applied to the individual data blocks, but the accumulation of hashes may be incorporated into a single DNS request. In one application, the "aggregated" DNS request may be a string of the different hashes generated for a number of independent email attachments for a single email message. However, aggregated DNS requests may include hashes that report blocks of data that are not related in any manner.

As another alternative in the use of the invention, the data collection may be unrelated to providing network security. That is, the ability of a node to transmit DNS requests as reporting vehicles may be used in other applications that require or benefit from data collection from distributed sources. Because the information is reported in the format of DNS requests, the information is less likely to be blocked as a consequence of the application of security rules at networks that include one or more of the sources.

CONCLUSION

As is well known in the art, the techniques described herein can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

A number of embodiments of the invention have been described. Nevertheless, it will be understood that various modifications may be made without departing from the spirit and scope of the invention. For example, other network topologies may be used. Accordingly, other embodiments are within the scope of the following claims.

The invention claimed is:

1. A method for operating a server at a remote site of a central security provider to receive DNS requests, wherein at least some of said DNS requests include a plurality of hashes separated by a symbol, the method comprising:
receiving from a plurality of independent networks that are enabled to exchange data with said central security provider, using a same algorithm to generate identical hashes upon each occurrence of transfer of identical blocks of data, a unique Domain Name System (DNS) request, each unique DNS request comprising a plurality of non-random indicators that is specifically related to contents of each transfer of a block of data that is an unambiguous result of applying an algorithm to each block of data whereby a second transfer of an identical block of data through at least one of a plurality of network nodes results in the same hash, and includes a count value for each transfer of an identical block of data, and a unique label which prevents DNS caching, whereby occurrence of transfer of an identical block of data a plurality of times is distinguished from the same plurality of occurrences of transfer of blocks of data which never repeat;
dissecting a DNS request in order to identify each hash within an aggregated DNS request,
determining frequencies of transfer of each block of data which occur in email receptions at the plurality of network nodes; and
responding to a DNS request with a DNS response which provides instructions to initiate blocking actions and email disposition at the plurality of network nodes.

2. The method of claim 1 wherein said block of data is an attachment of an email message.

3. The method of claim 1 wherein said block of data is an image which is a component of an email message.

4. The method of claim 1 wherein said non-random indicator is generated to identify Uniform Resource Locators (URLs) detected within said email transmissions.

5. The method of claim wherein said non-random indicator is generated to identify IP addresses relevant to said email transmissions.

6. The method of claim 1 wherein said non-random indicator is generated to identify an IP address of a source of said block of data.

7. An apparatus for monitoring and controlling email traffic comprising:
- a receiver circuit for to receive instructions from a remote site as a Domain Name System (DNS) response to a DNS request, said instructions being relevant to processing of said email traffic being monitored at a plurality of network nodes;
- a detection circuit coupled to a network to detect occurrence of a transfer of a block of data associated with email traffic with respect to at least one of a plurality of network nodes; coupled to
- a non-random indicator generation circuit to generate a non-random indicator that is specifically related to contents of said block of data, the non-random indication generation circuit comprising instructions for adapting a processor to apply a particular algorithm to said block of data to define said indicator as a digital fingerprint that is an unambiguous result of said algorithm; coupled to
- an accumulator circuit to count each reoccurrence of transfer of different blocks of data; coupled to
- a communication circuit to report a resulting count value of said transfers when a threshold is reached, by incorporation of a string of non-random indicators and their counts into a unique Domain Name Service (DNS) request directed to a remote site which prevents DNS caching, whereby occurrence of transfer of an identical block of data a plurality of times is distinguished from the same plurality of occurrences of transfer of blocks of data which never repeat;

wherein said non-random indicator includes a hash as a consequence of applying said algorithm, said incorporation comprising configuring said DNS request to include a plurality of hashes separated by a symbol;
- a processor adapted to transmit said unique DNS request to a remote site via a global communications network, thereby enabling said remote site to determine a count of occurrences of transfers of said block of data at the plurality of network nodes; and
- an enforcement component to control email traffic according to instructions received in said DNS response.

* * * * *